(12) United States Patent
Suguiura et al.

(10) Patent No.: US 11,748,707 B2
(45) Date of Patent: Sep. 5, 2023

(54) QUANTUM COMPUTATION FOR BILL OF MATERIALS RECOMMENDATIONS

(71) Applicant: Accenture Global Solutions Limited, Dublin (IE)

(72) Inventors: Rodrigo Morimoto Suguiura, São Paulo (BR); Jair Antunes De Carvalho, Jr., São Paulo (BR)

(73) Assignee: Accenture Global Solutions Limited, Dublin (IE)

( * ) Notice: Subject to any disclaimer, the term of this patent is extended or adjusted under 35 U.S.C. 154(b) by 23 days.

(21) Appl. No.: 17/224,625

(22) Filed: Apr. 7, 2021

(65) Prior Publication Data

US 2022/0327479 A1   Oct. 13, 2022

(51) Int. Cl.
| | |
|---|---|
| *G06Q 10/0875* | (2023.01) |
| *G06N 10/00* | (2022.01) |
| *G06Q 50/04* | (2012.01) |
| *G06Q 10/0631* | (2023.01) |
| *G06N 10/60* | (2022.01) |

(52) U.S. Cl.
CPC ......... *G06Q 10/0875* (2013.01); *G06N 10/00* (2019.01); *G06Q 10/06313* (2013.01); *G06Q 50/04* (2013.01); *G06N 10/60* (2022.01)

(58) Field of Classification Search
CPC ......... G06Q 10/0875; G06Q 10/06313; G06Q 50/04; G06N 10/00
USPC ....................................................... 705/7.23
See application file for complete search history.

(56) References Cited

U.S. PATENT DOCUMENTS

| | | | | |
|---|---|---|---|---|
| 10,044,638 | B2* | 8/2018 | Dadashikelayeh | G06F 16/25 |
| 10,223,084 | B1* | 3/2019 | Dunn | G06N 10/00 |
| 10,592,816 | B1* | 3/2020 | Hsu | G06N 10/60 |
| 2011/0047201 | A1* | 2/2011 | Macready | B82Y 10/00 |
| | | | | 708/446 |
| 2013/0144925 | A1* | 6/2013 | Macready | G06F 17/10 |
| | | | | 708/620 |
| 2018/0053112 | A1* | 2/2018 | Bravyi | G06N 10/00 |

(Continued)

OTHER PUBLICATIONS

Sebastian Feld, A Hybrid solution for the capacitated vehicle routing problem using a quantum annealer. (Year: 2019).*

(Continued)

*Primary Examiner* — Abdallah A El-Hage Hassan
(74) *Attorney, Agent, or Firm* — Fish & Richardson P.C.

(57) ABSTRACT

Methods, systems, and apparatus for solving cost optimization problems. In one aspect, a method includes receiving data representing a bill of materials (BOM) optimization problem, the BOM optimization problem comprising a task of determining a BOM recommendation that satisfies one or more constraints, wherein each constraint comprises one or more constraint variables and a constraint constant; generating, based on the data representing the BOM optimization problem, a quadratic unconstrained binary optimization (QUBO) formulation, wherein the QUBO formulation comprises i) for each constraint variable in the one or more constraints, a binary representation of the constraint variable and ii) a first parameter that depends on a difference between a respective constraint constant and the binary representations of the constraint variables; and obtaining data representing a solution to the BOM optimization problem from a quantum computing resource.

20 Claims, 4 Drawing Sheets

(56) References Cited

U.S. PATENT DOCUMENTS

| | | | | |
|---|---|---|---|---|
| 2019/0228333 | A1* | 7/2019 | Bravyi | G06N 10/00 |
| 2020/0293939 | A1* | 9/2020 | Irie | G08G 1/096844 |
| 2020/0401650 | A1* | 12/2020 | Chen | G06F 17/16 |
| 2021/0248489 | A1* | 8/2021 | Yarkoni | G06N 10/00 |
| 2021/0303915 | A1* | 9/2021 | Mandal | G06F 18/2433 |
| 2022/0300843 | A1* | 9/2022 | Rahmes | G06F 15/82 |

OTHER PUBLICATIONS

L. R. Ford, Jr. Flows in Networks (Year: 1974).*
C. Bauckhage, Towards shortest paths via adiabatic quantum computing (Year: 2018).*
Sebastian Feld "A Hybrid Solution Method for the Capacitated Vehicle Routing Problem Using a Quantum Annealer" LMUMunich Mobile and Distributed Systems Group Munich, Germany 2019 (Year: 2019).*
Bauckhage, E. Brito "Towards Shortest Paths Via Adiabatic Quantum Computing" Fraunhofer Center for Machine Learning and Fraunhofer IAIS St. Augustin, Germany (2018). (Year: 2018).*

* cited by examiner

QUANTUM COMPUTATION FOR BILL OF MATERIALS RECOMMENDATIONS

TECHNICAL FIELD

The present invention relates to cost optimization problems and quantum computing.

BACKGROUND

A bill of materials (BOM) is an inventory of the raw materials, sub-assemblies, intermediate assemblies, sub-components, or parts needed to manufacture an end product. Each item in a BOM can vary based on characteristics such as weight, resistance, colour, material, cost, availability, vendor, etc. Therefore, the number of possible BOM configurations grows exponentially with the number of items and item characteristics. Determining an optimal BOM is a complex and even intractable problem for classical computers.

SUMMARY

This specification describes methods and systems for generating BOM recommendations using quantum computation.

In general, one innovative aspect of the subject matter described in this specification can be implemented in a method that include receiving data representing a bill of materials (BOM) optimization problem, the BOM optimization problem comprising a task of determining a BOM recommendation that satisfies one or more constraints, wherein each constraint comprises one or more constraint variables and a constraint constant; generating, based on the data representing the BOM optimization problem, a quadratic unconstrained binary optimization (QUBO) formulation, wherein the QUBO formulation comprises i) for each constraint variable in the one or more constraints, a binary representation of the constraint variable and ii) a first parameter that depends on a difference between a respective constraint constant and the binary representations of the constraint variables; and obtaining data representing a solution to the BOM optimization problem from a quantum computing resource.

Other implementations of this aspect include corresponding classical, quantum or classical-quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the one or more constraints comprise equality constraints that penalize candidate BOM recommendations that do not include a target quantity of BOM components, wherein each equality constraint comprises a linear combination of positive integer-valued constraint variables representing respective BOM components, the linear combination equal to a constraint constant representing a respective target quantity of BOM components.

In some implementations generating the QUBO formulation comprises, for each equality constraint in the one or more constraints: determining, for each constraint variable in the equality constraint, a binary representation of the constraint variable, the binary representation comprising a linear combination of one or more binary-valued variables, wherein each binary-valued variable in the linear combination is weighted by a respective power of 2; determining parameters for populating portions of a matrix representing a QUBO Hamiltonian function, wherein the parameters comprise the first parameter; and populating entries of the matrix representing the QUBO Hamiltonian function using the determined parameters.

In some implementations a number of binary-valued variables included in the linear combination is bounded above by logarithm to base 2 of: the respective target quantity of BOM components plus 1, divided by 2.

In some implementations the parameters for populating portions of the matrix representing the QUBO Hamiltonian function further comprise: a second parameter dependent on a respective target quantity of BOM components A given by $k=\max(f)$ for $2^f < (A+1)/2+2$; a third parameter given by $l=\max(i)$, where i indexes elements of the QUBO Hamiltonian function; and a first vector of parameters, wherein the first vector of parameters comprises the first parameter and is given by $r=(2^0, 2^1, \ldots, 2^m, C)$ where m represents a number of binary valued variables in the linear combination and C represents the first parameter.

In some implementations the method further comprises respective costs associated with each of the constraint variables in the equality constraint using the determined parameters.

In some implementations populating entries of the matrix representing the QUBO Hamiltonian function using the determined parameters comprises populating diagonal elements $Q_{i,i}$ of the matrix representation of the QUBO Hamiltonian function according to $Q_{i,i}=r_f(r_f-2*A+Cost_e)$ for all $e, f \in Z^+$ that satisfy $e<l$, $f<k$, and $i=e*k+f$, where $l=\max(i)$, $k=\max(f)$ for $2^f<(A+1)/2+2$, $r_f$ represents a f-th element of vector $r=(2^0, 2^1, \ldots, 2^m, C)$, A represents the respective target quantity of BOM components in the equality constraint, and $Cost_e$ represents a normalized cost of variable $x_e$.

In some implementations populating entries of the matrix representing the QUBO Hamiltonian function using the determined parameters comprises populating non-diagonal elements $Q_{i,j}$ of the matrix representation of the QUBO Hamiltonian function according to one or more of i) $Q_{i,j}=2r_f$ for all $e, f, o \in Z^+$ that satisfy $i=k*o+f$, $j=e*k+f$, $e<l$, $f<k$, $o<e$, where $l=\max(i)$, $k=\max(f)$ for $2^f<(A+1)/2+2$, and $r_f$ represents the f-th element of the vector $r=(2^0, 2^1, \ldots, 2^m, C)$, ii) $Q_{i,j}=(2*r_f*r)_g$ for all $e, f, o, g \in Z^+$ that satisfy, $i=k*o+g$, $j=e*k+f$, $g<f$, $e<l$, $f<k$, $o<e$, where $l=\max(i)$, $k=\max(f)$ for $2^f<(A+1)/2+2$, $r_f$ represents the f-th element of the vector $r=(2^0, 2^1, \ldots, 2^m, C)$ and $(2*r_f*r)_g$ represents g-th component of $2*r_f*r$, iii) $Q_{i,j}=(2*r_f*r)_g$ for all $e, f, o, p \in Z^+$ that satisfy $i=k*o+f$, $j=e*k+p$, $g<f$, $e<l$, $f<k$, $o<e$, where $l=\max(i)$, $k=\max(f)$ for $2^f<(A+1)/2+2$, $r_f$ represents the f-th element of the vector $r=(2^0, 2^1, \ldots, 2^m, C)$ and $(2*r_f*r)_g$ represents the g-th component of $2*r_f*r$, and iv) $Q_{i,j}=(2*r_f*r)_g$ for all $e, f, g \in Z^+$ that satisfy $i=k*e+g$, $j=e*k+f$, $g<f$, $e<l$, $f<k$, where $l=\max(i)$, $k=\max(f)$ for $2^f<(A+1)/2+2$, $r_f$ represents the f-th element of the vector $r=(2^0, 2^1, \ldots, 2^m, C)$ and $(2*r_f*r)_g$ represents the g-th component of $2*r_f*r$.

In some implementations the one or more constraints comprise inequality constraints that penalize candidate BOM recommendations that exceed respective cost thresholds, wherein each inequality constraint comprises a linear combination of positive integer-valued constraint variables representing respective BOM components, wherein the linear combination is weighted with respective positive integer valued costs and is less than or equal to a constraint constant representing a respective cost threshold.

In some implementations the cost thresholds comprise maximum acceptable monetary costs, lead times, weights, volumes or qualities.

In some implementations generating the QUBO formulation comprises, for each inequality constraint in the one or more constraints: determining, for each constraint variable in the inequality constraint, a binary representation of the constraint variable, the binary representation comprising a linear combination of one or more binary-valued variables, wherein each binary-valued variable in the linear combination is weighted by a respective power of 2; determining parameters for populating portions of a matrix representing a QUBO Hamiltonian function, wherein the parameters comprise the first parameter; and populating entries of the matrix representing the QUBO Hamiltonian function using the determined parameters.

In some implementations the number of binary-valued variables included in the linear combination is bounded above by the logarithm to base 2 of: the respective constraint variable plus 1, divided by 2.

In some implementations the parameters for populating portions of the matrix representing the QUBO Hamiltonian function further comprise: a fourth parameter dependent on the inequality constraint cost threshold, given by a difference between the inequality constraint cost threshold and a linear combination of binary-valued slack variables, wherein a number of slack variables included in the linear combination of binary-valued slack variables is less than or equal to the logarithm to base 2 of: respective cost threshold B plus 1, divided by 2 and each slack variable in the linear combination is weighted by a respective power of 2; a fifth parameter dependent on s maximum value of a respective constraint variable given by $k=\max(f$ for $2^f<(\max(x_i)+1)/2)+2$ where $x_i$ represents the respective constraint variable; a second vector of parameters, wherein the second vector of parameters comprises the first parameter and is given by $r=(2^0, 2^1, \ldots, 2^m, C)$ where m represents the number of binary valued variables in the linear combination and C represents the first parameter; a third vector of parameters, wherein the third vector of parameters comprises the fourth parameter and is given by $s=(2^0, 2^1, \ldots, 2^q, y)$ where q represents the number of slack variables in the linear combination and y represents the fourth parameter; and a sixth parameter dependent on the cost threshold and given by $u=\max(f$ for $2^f<(B+1)/2)+2$ where B represents the cost threshold.

In some implementations populating entries of the matrix representing the QUBO Hamiltonian function using the determined parameters comprises populating diagonal elements $Q_{i,i}$ of the matrix representation of the QUBO Hamiltonian function according to $Q_{i,i}=s$ for all $i \in Z^+$ that satisfy $i<u$, where $u=\max(f$ for $2^f<(B+1)/2)+2$.

In some implementations populating entries of the matrix representing the QUBO Hamiltonian function using the determined parameters comprises populating non-diagonal elements $Q_{i,j}$ of the matrix representation of the QUBO Hamiltonian function according to one or more of i) $Q_{j,i}=2s_is_j$ for all i, $j \in Z^+$ that satisfy $i<u$ and $j<i$, where $u=\max(f$ for $2^f<(B+1)/2)+2$ and $s_i$ represents i-th element of vector $s=(2^0, 2^1, \ldots, 2^q, y)$, ii) $Q_{j,i+u}=-2r_is_j$ for all i, $j \in Z^+$ that satisfy $i<k$ and $j<u$, where $u=\max(f$ for $2^f<(B+1)/2)+2$, $s_j$ represents j-th element of the vector $s=(2^0, 2^1, \ldots, 2^q, y)$ and $r_i$ represents the i-th element of the vector $r=(2^0, 2^1, \ldots, 2^m, C)$, iii) $Q_{j+u,i+u}=2r_ir_j$ for all i, $j \in Z^+$ that satisfy $i<k$ and $j<i$, where $k=\max(f$ for $2^f<(\max(x_i)+1)/2)+2$, $u=\max(f$ for $2^f<(B+1)/2)+2$ and $r_i$ represents the i-th element of the vector $r=(2^0, 2^1, \ldots, 2^m, C)$, and iv) $Q_{i+u,i+u}=r_i^2$ for all $i \in Z^+$ that satisfies $i<k$, where $k=\max(f$ for $2^f<(\max(x_i)+1)/2)+2$, $u=\max(f$ for $2^f<(B+1)/2)+2$ and $r_i$ represents the i-th element of the vector $r=(2^0, 2^1, \ldots, 2^m, C)$.

In some implementations the data representing the BOM optimisation problem comprises i) a list of components required to manufacture an end product and ii) target properties of a requested BOM.

In some implementations the data representing the BOM optimization problem is received as user input through a user interface presentation and wherein the method further comprises: displaying, through the user interface presentation, information about the solution to the BOM optimization problem, the information comprising i) a description of a BOM recommendation corresponding to the solution, ii) a technical drawing of an end product made using the BOM recommendation, and iii) a comparison of costs associated with the solution.

In some implementations the method further comprises obtaining data representing multiple solutions to the BOM optimization problem from the quantum computing resource, wherein each solution to the BOM optimization problem corresponds to a respective computation performed by the quantum computing resource.

In some implementations the data representing the BOM optimization problem is received as user input through a user interface presentation and wherein the method further comprises: displaying, through the user interface presentation, information about multiple solutions to the BOM optimization problem, the information comprising one or more of i) properties of end products corresponding to the multiple solutions to the BOM optimization problem, ii) technical drawings of end products made using the BOM recommendations, and ii) a comparison of costs associated with the multiple solutions.

The subject matter described in this specification can be implemented in particular ways so as to realize one or more of the following advantages.

Cost optimization systems that utilize quantum computing resources, as described in this specification, can more quickly obtain solutions to cost optimization problems compared to cost optimization systems that use only classical computing resources. For example, cost optimization problems with a number of possible configurations that exceed $2 \times 10^{18}$ can be intractable for current classical supercomputers. BOM recommendation tasks can quickly exceed this threshold. For example, for a product with 20 components where each component can have 10 different variations there are $10^{20}$ possible configurations which is 50 times larger than the above threshold. However, by formulating cost optimization problems as a quadratic unconstrained binary optimization (QUBO) problems using the techniques described in this specification, the cost optimization problems can be provided to a quantum computing resource that has the processing capabilities to solve cost optimization problems efficiently, e.g., in a time that is independent of the size of the problem, such as fast as qubit decay time which can be of the order of μs. In addition, solutions obtained from a quantum computing resource can be more accurate compared to solutions obtained from a classical computing resource that implements heuristics and assumptions to simplify the complexity of an otherwise intractable cost optimization problem.

Because of this increase in efficiency, cost optimization problems can be updated and solved in real time. This can be particularly advantageous in dynamic applications such as production planning, where problem parameters can often change or be updated. In addition, because of this increase in efficiency, highly complex problems can be solved exactly without the use of heuristics that typically reduce the complexity of the problem and therefore produce solutions with lower accuracy. For example, currently engineers manually select BOM recommendations that balance target requirements and cost thresholds. This is typically achieved by restricting the number of variations/options considered, which can result in suboptimal BOM recommendations. A BOM recommendation system implementing the presently described techniques can avoid such restrictions and therefore generate better BOM recommendations.

In addition, because of the power and probabilistic nature of quantum computing, a BOM recommendation system implementing the presently described techniques can enable different BOM configurations to be efficiently explored. For example, a user of the system can instruct one or more quantum computing resources to repeatedly process a same BOM recommendation optimization problem to obtain multiple solutions to the BOM optimization problem, where each solution corresponds to a respective computation/run performed by a quantum computing resource. Due to the probabilistic nature of quantum computing, the multiple solutions are highly likely to differ since each solution can correspond to a respective minimum in a cost landscape. The system can display information about the multiple solutions, including one or more of a description of each BOM recommendation, technical drawings of end products made using each BOM recommendation, and a comparison of costs associated with the multiple solution, e.g., multiple radar charts with multiple axes representing respective costs. A user can then review the different BOM recommendations in parallel and select a particular BOM recommendation from the multiple solutions based on a user-specific criteria or properties. This method of exploration is far more efficient than iteratively submitting requests for a BOM recommendation and adjusting a technical design based on an obtained solution.

In addition, the presently described techniques for generating a QUBO formulation of a BOM recommendation cost optimization problem are particularly adapted to specific technical implementations. For example, generating a QUBO formulation that includes a binary representation of each BOM constraint variable and a respective parameter that depends on a difference between a respective BOM constraint constant and the binary representation of the constraint variable, the total number of qubits required to perform the optimization and generate an optimal BOM recommendation is reduced. Accordingly, the presently described techniques are suitable for both near-term quantum computing resources with low numbers of qubits, e.g., noisy intermediate scale quantum (NISQ) devices, as well as long-term quantum computing resources with a scalable number of qubits.

In addition, the presently described techniques for generating a QUBO formulation of a BOM recommendation cost optimization problem can be deployed in a cloud computing environment for use by API calls and can therefore be used in a large scale production system.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes methods and systems for generating BOM recommendations and exploring different BOM configurations using quantum computation.

The presently described techniques can be widely applied to various cost optimization problems, e.g., an optimization problem that can be represented as a linear equations and inequalities. However, for convenience and without loss of generality, the presently described techniques are primarily described in the context of generating BOM recommendations.

Figure 1:
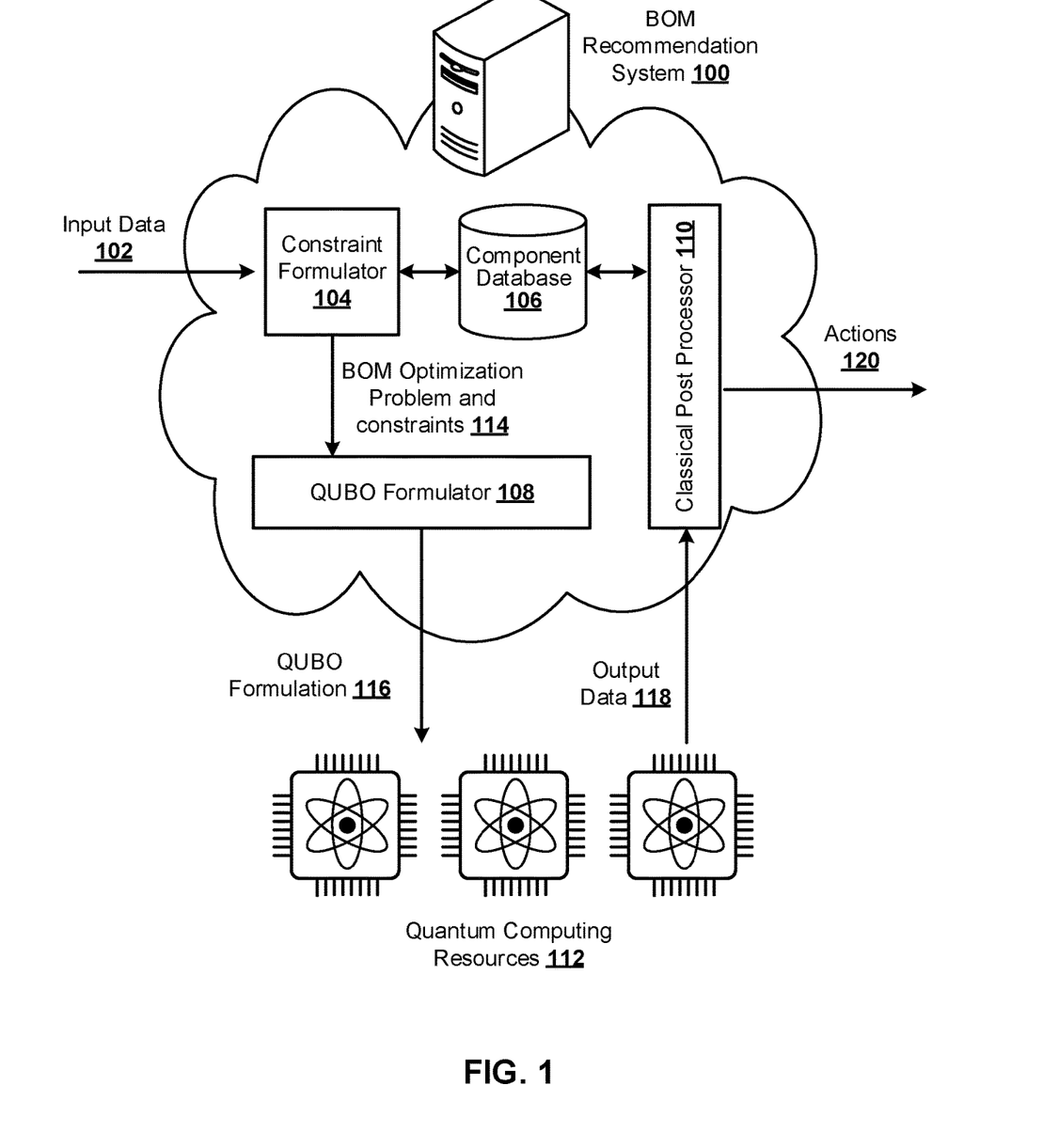
FIG. 1 shows an example system for generating BOM recommendations.

FIG. 1 depicts an example system 100 for generating BOM recommendations. The system 100 is an example of a system implemented as computer programs on one or more classical or quantum computing devices in one or more locations, in which the systems, components, and techniques described below can be implemented.

The system 100 includes a constraint formulator 104, a component database 106, a QUBO formulator 108, a classical post-processor 110, and one or more quantum computing resources 112. The quantum computing resources 112 are shown as being external to the system 100. However in some implementations the system 100 can include the quantum computing resources 112. Components of the system 100 can be in data communication with the quantum computing resources 112, e.g., through a communication network such as a local area network or wide area network.

The system 100 is configured to receive as input data associated with a BOM optimization problem, e.g., input data 102. The BOM optimization problem can be the problem of determining a BOM recommendation that satisfies one or more constraints. The input data 102 can includes a list of required components, e.g., a list of raw materials, sub-assemblies, intermediate assemblies, sub-components, or parts, and the quantities of each needed to manufacture an end product. In some implementations the system can receive the list of required components through a GUI. For example, a user can input data requesting a BOM recommendation using the GUI, where the request specifies the list of required components.

The data representing the BOM optimization problem can further include one or more target properties of a requested BOM recommendation, e.g., target quantities and costs. The target properties can be user-specific and can vary. In some implementations the system can also receive the target properties through the GUI. For example, in some implementations a user can provide the system with input data representing a maximum acceptable monetary cost for the total BOM and/or a maximum acceptable monetary cost for particular components included in the BOM. As another example, a user can input data representing a maximum acceptable lead time between the placement of an order for the BOM and receipt of the required components. Other example user-specified target properties include a maximum or minimum acceptable total weight or volume of a product made using the required components, a minimum acceptable quality of particular components included in the BOM and/or the BOM as whole, or data specifying unacceptable properties of some or all of the required components, e.g., unacceptable colours, shapes or materials. Alternatively or in addition, a user can provide an indication that the BOM recommendation should optimize one or more of monetary cost, lead time, weight, volume or quality, e.g., by selecting one or more options displayed in the GUI.

The system 100 is configured to determine a solution to the BOM optimization problem represented by the input data 102. To determine a solution to the BOM optimization problem, the system 100 uses one or more of the constraint formulator 104, the QUBO formulator 108 or the classical post processor 110.

The constraint formulator 104 is configured to receive the input data 102 and to process the received input data to generate formal constraints to be satisfied by computed BOM recommendations. The generated constraints can include equality constraints that penalize candidate BOM recommendations that do not include a target (e.g., correct) quantity of BOM components. The generated constraints can also include inequality constraints that penalize candidate BOM recommendations that exceed respective cost thresholds. To generate the constraints, the constraint formulator 104 can access the component database 106 to obtain data relating to the BOM components listed in the input data 102. For example, the component database 106 can store information about various BOM components and suppliers of the BOM components, e.g., including prices charged by the suppliers, supplier capacity, supplier lead times, and/or information about the types of components the supplier can provide, e.g., component weight, volume, size, shape, colour, or quality. Example operations performed by the constraint formulator 104 when processing received input data 102 are described in detail below with reference to FIG. 2.

The constraint formulator 104 is configured to provide data specifying the BOM optimization problem and BOM constraints 114 to the QUBO formulator 108. The QUBO formulator 108 is configured to map the data to a quadratic unconstrained binary optimization (QUBO) formulation 116 of the BOM optimization problem. To map the data to a QUBO formulation 116, the QUBO formulator 108 maps some of the data 114 to QUBO variables that take binary values determined by states of respective qubits. The QUBO formulator 108 further maps some of the data 114 to a QUBO Hamiltonian function represented by a matrix. Example operations performed by the QUBO formulator 108 are described below with reference to FIGS. 2-4.

The system 100 is configured to transmit data representing the QUBO formulation 116 of the BOM optimization problem represented by the input data 102 to the quantum computing resource 112. In some implementations the quantum computing resource 112 may be a near-term quantum computing resources with a low number of qubits, e.g., a NISQ device.

In some implementations the quantum computing resource 112 can be a quantum annealer. A quantum annealer is a device configured to perform quantum annealing. Quantum annealing can be thought of as a procedure for finding the global minimum of a given objective function over a given set of candidate states using quantum tunnelling. Quantum tunnelling is a quantum mechanical phenomenon where a quantum mechanical system overcomes localized barriers in the energy landscape which cannot be overcome by a classically described system. Some quantum annealer devices perform a subclass of quantum annealing called adiabatic quantum computing, which relies on the adiabatic theorem to perform computations.

Quantum annealer devices can solve problems if they are formulated in an acceptable format. For example, quantum annealer devices can solve some QUBO formulations of problems by mapping the QUBO formulation into a qubit network of a quantum annealer device.

In other implementations the quantum computing resources can be a quantum gate processor. A quantum gate processor includes one or more quantum circuits, i.e., models for quantum computation in which a computation is performed using a sequence of quantum logic gates, operating on a number of qubits (quantum bits). Quantum gate processors can be used to solve certain optimization problems, e.g., problems that can be formulated as a QUBO problem. For example, some quantum gate processors can solve QUBO problems by simulating a corresponding adiabatic quantum annealing process using a gate model. This can be advantageous, e.g., compared to directly performing the corresponding adiabatic quantum annealing process using a quantum annealer device, since not all quantum annealer devices can realize physical quantum systems that represent an optimization problem. For example, some quantum annealer devices may not provide the physical interactions necessary to solve an optimization problem. In these examples, a Hamiltonian describing the optimization problem can be decomposed into a sequence of single or multi-qubit quantum gates, and a solution to the optimization problem can be obtained through application of the sequence of single or multi-qubit gates on a register of qubits and subsequent measurement of the register of qubits.

The quantum computing resource 112 processes the received data to generate output data 118 representing one or more solutions to the BOM optimization problem. The quantum computing resource is configured to provide the generated output data 118 to the system 100, e.g., to the classical post processor 110.

The system 100 is configured to receive the output data 118 from the quantum computing resource 112. The classical post-processor 110 is configured to process the received output data 118. For example, the classical post-processor can be configured to extract a solution to the BOM optimization problem from the output data 118. In addition, the classical post-processor can determine one or more actions to be taken based on the solution to the BOM optimization problem. For example, the classical post-processor 110 can cause the solution to the BOM optimization problem to be presented to a user through a user interface presentation, e.g., a user interface presentation in which the input data 102 is received. The user interface presentation can display information about the solution to the BOM optimization problem, including one or more a description of a BOM recommendation corresponding to the solution, a technical drawing of an end product made using the BOM recommendation, and a comparison of costs associated with the solution, e.g., a radar chart with multiple axes representing respective costs. Example operations performed by the classical post-processor 110 are described below with reference to FIG. 2.

Figure 2:
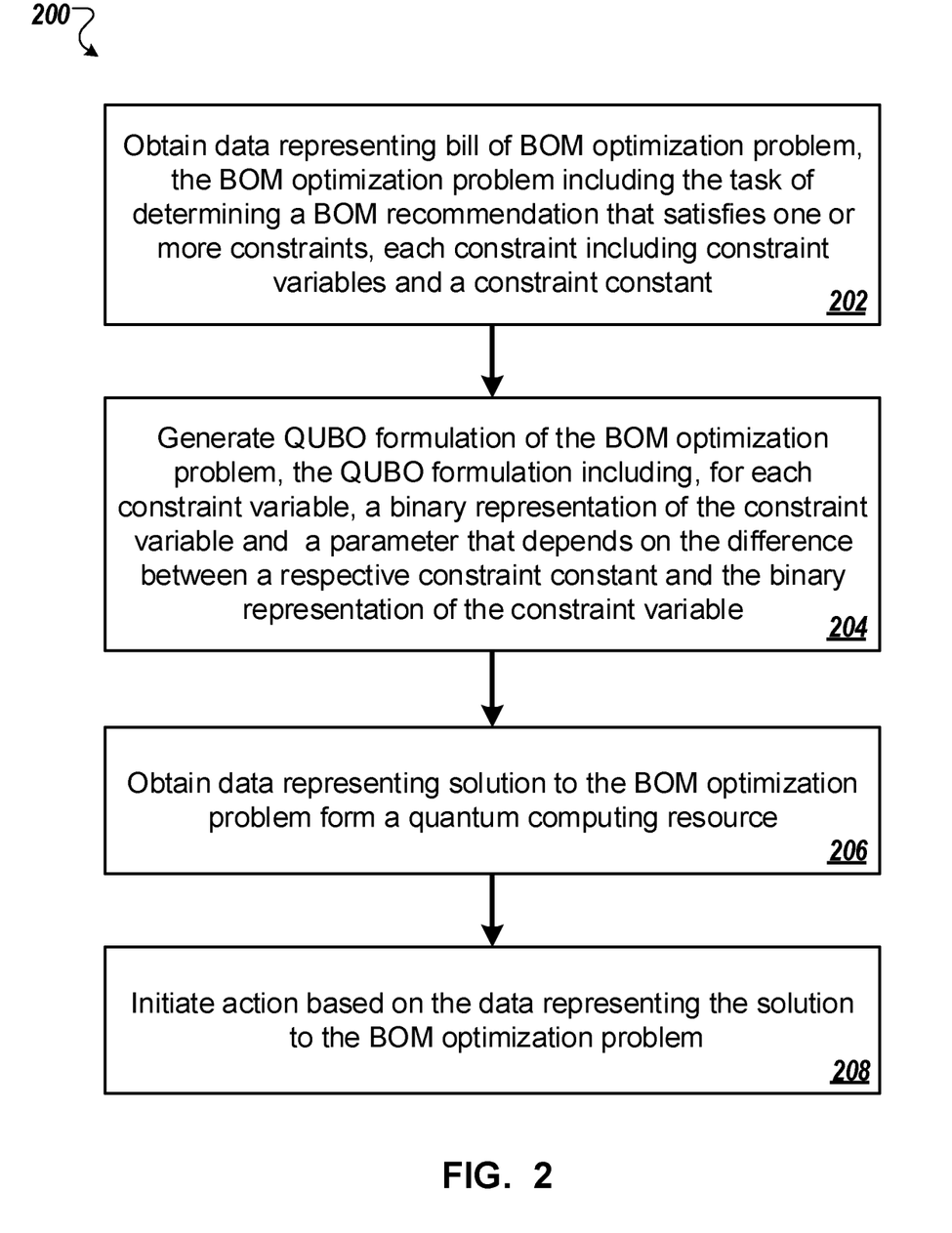
FIG. 2 is a flow diagram of an example process for generating a BOM recommendation using quantum computing resources.

FIG. 2 is a flowchart of an example process 200 for generating a BOM recommendation using quantum computing resources. For convenience, the process 200 will be described as being performed by a system of one or more classical or quantum computing devices located in one or more locations. For example, example system 100 of FIG. 1, appropriately programmed in accordance with this specification, can perform the process 200.

The system receives data representing a bill of materials (BOM) optimization problem (step 202). The BOM optimization problem is the task of determining a BOM recommendation that satisfies one or more constraints. The data representing the BOM optimization problem includes a list of required components, e.g., a list of raw materials, sub-assemblies, intermediate assemblies, sub-components, or parts, and the quantities of each needed to manufacture an end product. In some implementations the system can receive the list of required components through a GUI. For example, a user can input data requesting a BOM recommendation using the GUI, where the request specifies the list of required components.

The data representing the BOM optimization problem can further include one or more target properties of a requested BOM recommendation, e.g., target quantities and costs. The target properties can be user-specific and can vary. In some implementations the system can also receive the target properties through the GUI. For example, in some implementations a user can provide the system with input data representing a maximum acceptable monetary cost for the total BOM and/or a maximum acceptable monetary cost for particular components included in the BOM. As another example, a user can input data representing a maximum acceptable lead time between the placement of an order for the BOM and receipt of the required components. Other example user-specified target properties include a maximum or minimum acceptable total weight or volume of a product made using the required components, a minimum acceptable quality of particular components included in the BOM and/or the BOM as whole, or data specifying unacceptable properties of some or all of the required components, e.g., unacceptable colours, shapes or materials.

Alternatively or in addition, a user can provide an indication that the BOM recommendation should optimize one or more of monetary cost, lead time, weight, volume or quality, e.g., by selecting one or more options displayed in the GUI.

Optionally, the data representing the BOM optimization problem can also include data representing information about candidate suppliers of the required components. For example, a user can provide information specifying approved or preferred suppliers of some or all of the required components. The information can include prices charged by the suppliers, supplier capacity, supplier lead times, and/or information about the types of components the supplier can provide, e.g., component weight, volume, size, shape, colour, quality. Alternatively or in addition, the system can maintain or otherwise access a database that stores such information.

In some implementations the received data representing the BOM optimization problem can include formal constraints to be satisfied by candidate BOM recommendations, e.g., the list of required components and target properties of a requested BOM recommendation can already be formulated as a one or more equality and inequality constraints as described below with reference to Equations (1) and (2). In other implementations the system can process the received data representing the BOM optimization problem to generate formal constraints to be satisfied by candidate BOM recommendations.

For example, in some implementations the system can process the received data representing the BOM optimization problem to generate a set of equality constraints that penalize candidate BOM recommendations that do not include a target (e.g., correct) quantity of BOM components. Each equality constraint includes a linear combination of positive integer valued constraint variables representing respective BOM components, where the linear combination of positive integer valued variables is equal to a constraint constant representing a respective target quantity of BOM components. These constraints can take the form $$x_1+x_2 \ldots +x_n=A \text{ for } x_i \in Z^+ \quad (1)$$

where A is the constraint constant and represents a target quantity of BOM components and $x_i \in Z^+$ are the constraint variables and represent positive integer valued quantities, as described in more detail below.

In some implementations one or more constraints in the set of equality constraints can correspond to component suppliers. For example, the system can generate a constraint that penalizes candidate BOM recommendations that source BOM components from multiple suppliers but do not include a target total quantity of BOM components. In this example, A in Equation (1) represents the total quantity of BOM components as specified by the data received at step 202 and $x_i$ represents a number of components provided by supplier $i \in \{1, \ldots, n\}$ where n represents the total number of available suppliers (as specified by the user at step 202 or in a database maintained or otherwise accessed by the system). For example, if a user provides input data specifying that the BOM should include 5000 components and that the components can only be obtained from suppliers X, Y or Z, the total quantity of BOM components is A=5000, the total number of available suppliers is n=3 and $x_i$ represents a number of components provided by one of the three suppliers, e.g., the system generates a constraint of the form: $x_1+x_2+x_3=5000$ for $x_1, x_2, x_3 \in Z^+$.

In some implementations one or more constraints in the set of equality constraints can correspond to respective types of required components. For example, the system can generate, for each required component of a given type, a constraint that penalizes candidate BOM recommendations that include different versions of the component of the given type but do not include a target total quantity of the component of the given type. In this example, in Equation (1) A represents the total quantity of the component of the given type as specified by the data received at step 202 and $x_i$ represents a number of the component of the given type of variation $i \in \{1, \ldots, n\}$ where n represents the total number of available variations. For example, if a user provides input data specifying that the BOM should include 300 screws of size 8 and the screws can be made from stainless steel, brass, titanium or bronze, the total required quantity of the component of the given type is A=300, the total number of available variations is n=4 and $x_i$ represents a number of size 8 screws of one of the four variations stainless steel, brass, titanium or bronze, e.g., the system generates the constraint: $x_1+x_2+x_3+x_4=300$ for $x_1, x_2, x_3, x_4 \in Z^+$.

The system can generate similar equality constraints that penalize candidate BOM recommendations that include different component models but do not include a target total quantity of the component. The total number of equality constraints generated by the system can be dependent on the number of target properties of the requested BOM received at step 202, e.g., the number of unacceptable or acceptable properties of required components.

As another example, in some implementations the system can process the received data representing the BOM optimization problem to generate a set of inequality constraints that penalize candidate BOM recommendations that exceed respective cost thresholds. Each inequality constraint includes a linear combination of positive integer-valued constraint variables representing respective BOM components, where the linear combination of positive integer valued variables is weighted with corresponding positive integer-valued costs and is less than or equal to a respective cost threshold (the constraint constant). For example, these constraints can take the form $$a_1 x_1 + a_2 x_2 \ldots + a_n x_n \leq B \text{ for } a_i \in Z^+ \quad (2)$$

where B is the constraint constant and represents a cost threshold, and $a_i \in Z^+$ represents a positive integer-valued cost associated with BOM component $x_i$, as described in more detail below. If costs associated with BOM components are real-valued, the system can multiply the values by 10 powered by the number of digits according to the decimal resolution required, and scale the candidate BOM recommendations accordingly.

In some implementations the data received at step 202 can include data specifying a maximum acceptable monetary cost for the entire BOM. In these implementations the system generates an inequality constraint that penalizes candidate BOM recommendations that exceed the maximum acceptable monetary cost for the entire BOM. In these cases, B in Equation (2) represents the maximum acceptable monetary cost and $a_i \in Z^+$ represents a monetary cost associated with each component $x_i$ included in the list of required components.

In some implementations the data received at step 202 can include data specifying a maximum acceptable monetary cost for a subset of the components in the list of required components. In these implementations the system generates an inequality constraint that penalizes candidate BOM recommendations where the monetary cost of the subset of components exceeds the maximum acceptable monetary cost. In such examples B in Equation (2) represents the maximum acceptable monetary cost for the subset of components and $a_i \in Z^+$ represents a monetary cost associated with each component $x_i$ included in the subset of components.

The system can generate similar inequality constraints that penalize candidate BOM recommendations that exceed other user-specified cost thresholds, e.g., lead time, weight, volume or quality thresholds. The total number of inequality constraints generated by the system can be dependent on the number of BOM cost thresholds/constraints received at step 202.

The system generates a QUBO formulation of the BOM optimization problem using the data representing the BOM optimization problem (step 204). In implementations where the system generates equality and inequality constraints for the BOM optimization problem, as described above, the system also uses the generated constraints to generate the QUBO formulation.

The QUBO formulation includes multiple binary-valued variables $z_i$ with values determined by states of respective qubits. The QUBO formulation also includes a Hamiltonian function represented by a matrix Q. For example, the QUBO formulation of the cost optimization problem can be expressed as an optimization of $$E(z \mid Q) = \sum_{i \leq j}^{N} z_i Q_{i,j} z_j \quad (3)$$

where N represents the total number of qubits, e.g., an optimization $$\min_z E(z \mid Q).$$

The Hamiltonian function Q encodes the problem constraints, as described in more detail below.

To generate the QUBO formulation of the data representing the BOM optimization problem, the system maps each equality and inequality constraint to the QUBO formulation. The QUBO formulation then includes, for each constraint variable in the equality and inequality constraints, a binary representation of the constraint variable and a parameter that depends on a difference between a respective constraint constant and the binary representation of the constraint variable. Example processes for embedding an equality constraint and an inequality constraint, e.g., constraints of the form given by Equations (1) and (2) above, in a QUBO formulation of the BOM optimization problem are described below with reference to FIGS. 3 and 4.

Mapping Equality Constraints to a QUBO Hamiltonian Function

Figure 3:
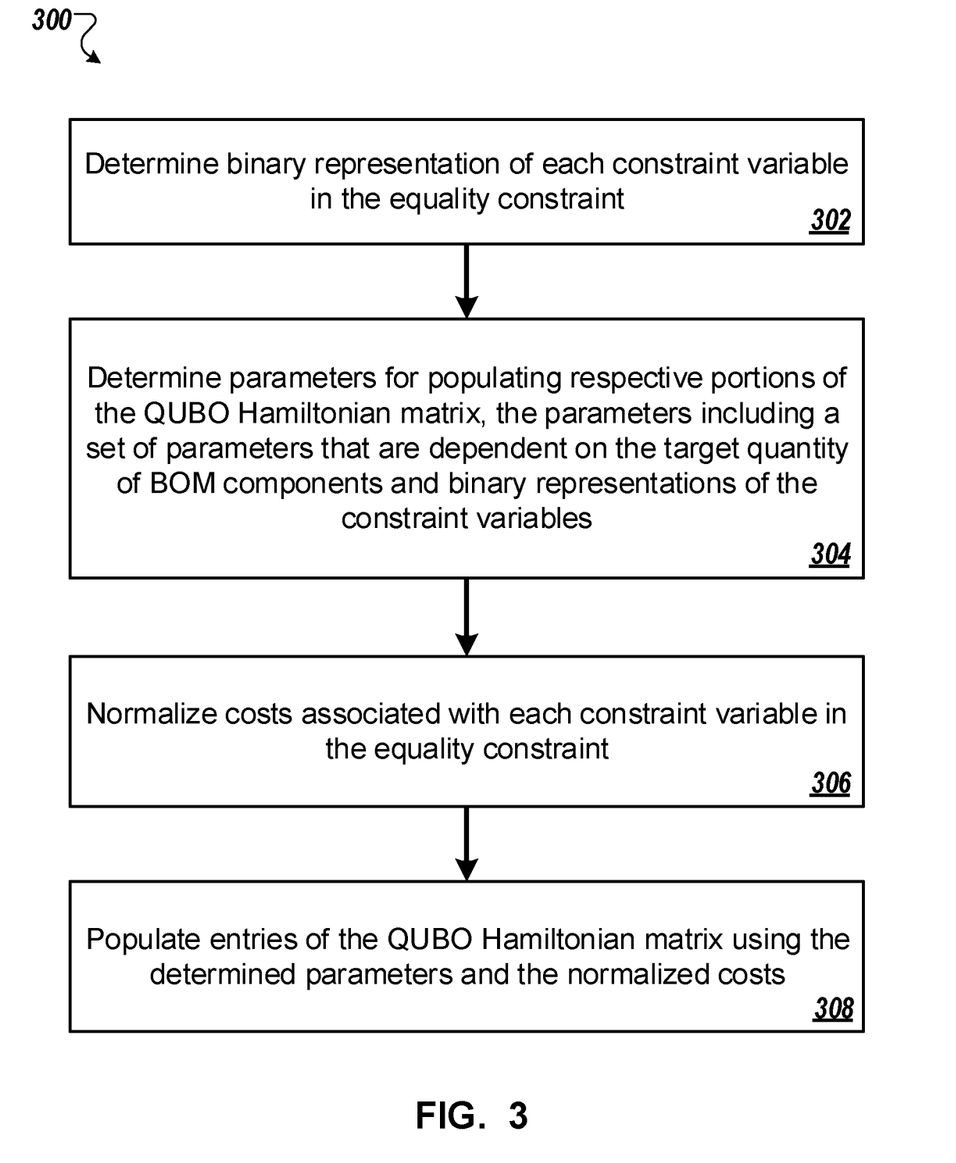
FIG. 3 is a flow diagram of an example process for embedding an equality constraint into a QUBO formulation of a cost optimization problem objective function.

FIG. 3 is a flowchart of an example process 300 for embedding an equality constraint into a QUBO formulation of a cost optimization problem objective function. For convenience, the process 300 will be described as being performed by a system of one or more classical or quantum computing devices located in one or more locations. For example, example system 100 of FIG. 1, appropriately programmed in accordance with this specification, can perform the process 300.

The system determines a binary representation of each variable $x_i$ in the equality constraint (step 302). Each binary representation of a respective variable $x_i$ includes a linear combination of one or more binary-valued variables $b_i$, where each binary-valued variable $b_i$ in the linear combination is weighted by a respective power of 2. The number m of binary valued variables $b_i$ included in the linear combination is bounded above by the logarithm (to base 2) of: the target quantity of BOM components A plus 1, divided by 2, e.g., $2^m \leq (A+1)/2$. For example, a binary representation of the variable $x_i$ in an equality constraint given by Equation (1) above can take the form $$x_i = 2^0 b_0^i + 2^1 b_1^i + \ldots + 2^m b_m^i \text{ for } 2^m \leq (A+1)/2, \quad (4)$$

where A represents the target quantity of BOM components and $b_j^i \in \{0,1\}$ for $j=0, \ldots, m$. Each $b_j^i$ corresponds to a respective qubit in the quantum computing resource, and the value taken by each $b_j^i$ is determined by the state of the respective qubit.

The system determines parameters for populating respective portions of the QUBO Hamiltonian function represented by the matrix Q (step 304). The parameters include a parameter C. The parameter C is dependent on the target quantity of BOM components A in the equality constraint. For example, the parameter C can take the form $$C = A - (2^0 + 2^1 + \ldots + 2^m), \quad (5)$$

The form of the parameter C as given in Equation (5) reduces the number of qubits required to obtain a solution to the BOM optimization problem, since it is not possible to determine an exact binary representation of an arbitrary value without the parameter C. Some hard-coded approaches implement a one-hot encoding to all values a in $0 \leq \alpha \leq x_i$ which require i+1 qubits instead of m qubits, where m represents the roof of the equation $m = \lfloor \log_2(i+1) \rfloor$ for $i>0$, and m=1 for i=0. Accordingly, the form of the parameter C as given in Equation (5) improves the computational efficiency of solving the BOM optimization problem, e.g., compared to hard coded approaches.

The parameters further include parameters {k, l} that will be used to identify elements of the matrix Q in step 308, as described in more detail below. The parameter k is dependent on the target quantity of BOM components A given in the equality constraint and is given by $$k = \max(f) \text{ for } 2^f < (A+1)/2 + 2. \quad (6)$$

The parameter $l$ is given by $$l = \max(i), \quad (7)$$

where i is defined below with reference to step 308.

The parameters further include a vector r of parameters that includes the parameter C and is given by $$r = (2^0, 2^1, \ldots, 2^m, C). \quad (8)$$

The system normalizes respective costs associated with the each of the variables $x_i$ in the equality constraint using the determined parameters (step 306). The normalization is based on the parameter C. For example, the system can normalize the costs associated with each of the variables $x_i$ by multiplying the un-normalized costs by a normalization factor that ensures each cost $Cost_i$ satisfies $\max(2^m, C) \cdot Cost_i < 1$. The costs $Cost_i$ are variables representing respective costs of the variables $x_i$ and are not constraining/limiting factors (e.g., can be independent of the constraints) but are determined by the type of the problem that is to be solved, e.g., based on the objective function that is to be optimized. For BOM recommendation problems the costs can represent monetary costs associated with producing the components represented by the variables $x_i$ and are dependent on the QUBO objective function that is to be optimized, e.g., can be user specific. In some implementations these costs can be set to zero, e.g., in the absence of a user specifying the cost or in cases where the BOM optimization problem includes only equality constraints. However, in other implementations, e.g., cases where the BOM optimization problem includes inequality constraints, the task of optimizing the QUBO objective function with respect to the costs is achieved by including the costs on the main diagonal of the matrix Q.

The system populates entries of the matrix Q using the determined parameters and the normalized costs (step 308). For example, the system populates diagonal elements of the matrix Q (e.g., adds the below quantity to respective diagonal entries of the matrix) according to $$Q_{i,j} = r_f(r_f - 2 \cdot A + Cost_e) \quad (9)$$

for all e, $f \in \mathbb{Z}^+$ that satisfy e<l, f<k, and i=e*k+f, where l=max(i) as defined in Equation (7), k=max(f) for $2^f<(A+1)/2+2$ as defined in Equation (6), $r_f$ represents the f-th element of the vector $r=(2^0, 2^1, \ldots, 2^m, C)$ defined in Equation (8), A represents the target quantity of BOM components in the equality constraint, and $Cost_e$ represents a normalized cost of variable $x_e$.

The system populates non-diagonal elements of the matrix Q (e.g., adds the below quantity to respective non-diagonal entries of the matrix) according to $$Q_{i,j} = 2r_f \quad (10)$$

for all e, f, $o \in \mathbb{Z}^+$ that satisfy i=k*o+f, j=e*k+f, e<l, f<k, o<e, where where l=max(i) as defined in Equation (7), k=max(f) for $2^f<(A+1)/2+2$ as defined in Equation (6), and $r_f$ represents the f-th element of the vector $r=(2^0, 2^1, \ldots, 2^m, C)$ defined at step 304.

The system populates non-diagonal elements of the matrix Q according to $$Q_{i,j} = (2 \cdot r_f \cdot r)_g \quad (11)$$

for all e, f, o, $g \in \mathbb{Z}^+$ that satisfy, i=k*o+g, j=e*k+f, g<f, e<l, f<k, o<e, where l=max(i) as defined in Equation (7), k=max(f) for $2^f<(A+1)/2+2$ as defined in Equation (6), $r_f$ represents the f-th element of the vector $r=(2^0, 2^1, \ldots, 2^m, C)$ defined at step 304 and $(2 \cdot r_f \cdot r)_g$ represents the g-th component of $2 \cdot r_f \cdot r$.

The system populates non-diagonal elements of the matrix Q according to $$Q_{i,j} = (2 \cdot r_f \cdot r)_g \quad (12)$$

for all e, f, o, $p \in \mathbb{Z}^+$ that satisfy i=k*o+f, j=e*k+p, g<f, e<l, f<k, o<e, where l=max(i) as defined in Equation (7), k=max(f) for $2^f<(A+1)/2+2$ as defined in Equation (6), $r_f$ represents the f-th element of the vector $r=(2^0, 2^1, \ldots, 2^m, C)$ defined at step 304 and $(2 \cdot r_f \cdot r)_g$ represents the g-th component of $2 \cdot r_f \cdot r$.

The system populates non-diagonal elements of the matrix Q according to $$Q_{i,j} = (2 \cdot r_f \cdot r)_g \quad (13)$$

for all e, f, $g \in \mathbb{Z}^+$ that satisfy i=k*e+g, j=e*k+f, g<f, e<l, f<k, where l=max(i) as defined in Equation (7), k=max(f) for $2^f<(A+1)/2+2$ as defined in Equation (6), $r_f$ represents the f-th element of the vector $r=(2^0, 2^1, \ldots, 2^m, C)$ defined at step 304 and $(2 \cdot r_f \cdot r)_g$ represents the g-th component of $2 \cdot r_f \cdot r$.

Mapping Inequality Constraint to a QUBO Hamiltonian Function

Figure 4:
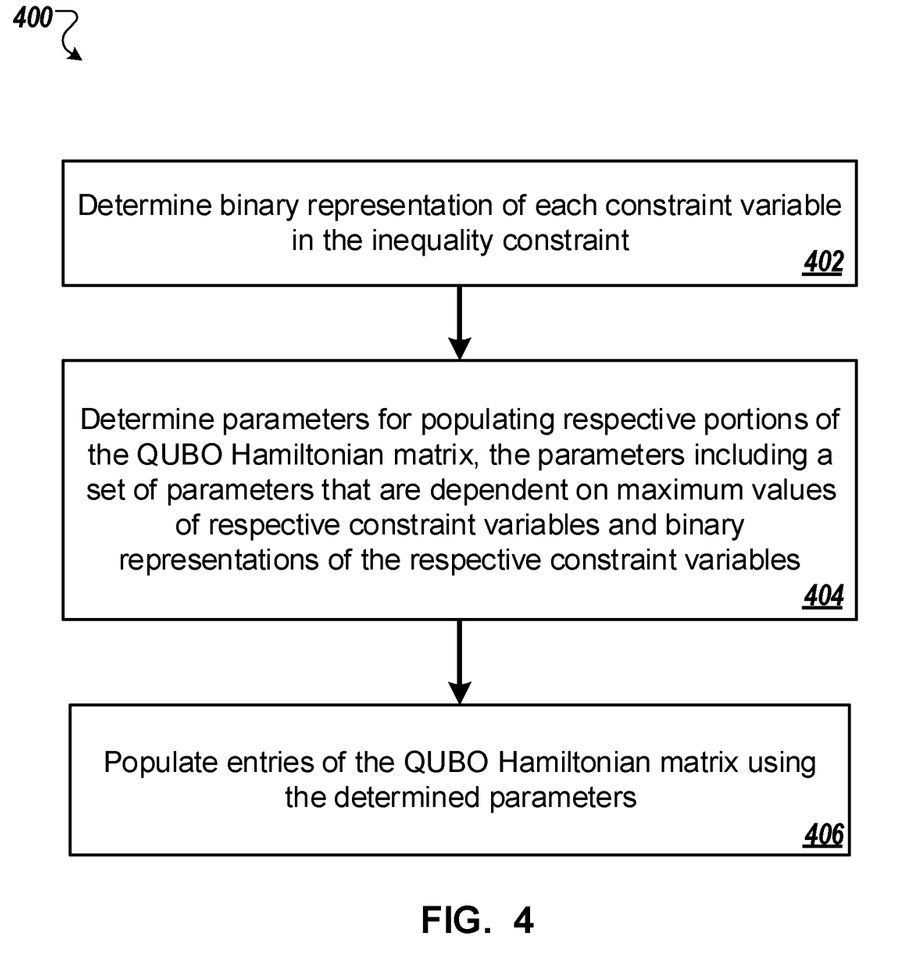
FIG. 4 is a flow diagram of an example process for embedding an inequality constraint into a QUBO formulation of a cost optimization problem objective function.

FIG. 4 is a flowchart of an example process 400 for embedding an inequality constraint into a QUBO formulation of a cost optimization problem objective function. For convenience, the process 400 will be described as being performed by a system of one or more classical or quantum computing devices located in one or more locations. For example, example system 100 of FIG. 1, appropriately programmed in accordance with this specification, can perform the process 400.

The system determines binary representation of each variable $x_i$ in the inequality constraint (step 402). Each binary representation of a respective variable $x_i$ includes a linear combination of one or more binary-valued variables $b_j$, where each binary-valued variable $b_j$ in the linear combination is weighted by a respective power of 2. The number m of binary variables $b_j$ included in the linear combination is bounded above by the logarithm (to base 2) of: the respective variable $x_i$ plus 1, divided by 2, e.g., $2^m \leq (x_i+1)/2$. For example, a binary representation of the variable $x_i$ in the inequality constraint given by Equation (2) above can take the form $$x_i = 2^0 b_0^i + 2^1 b_1^i + \ldots + 2^m b_m^i \text{ for } 2^m \leq (x_i+1)/2 \quad (14)$$

where $b_j^i \in \{0,1\}$. Each $b_j^i$ corresponds to a respective qubit in the quantum computing resource, and the value taken by each $b_j^i$ is determined by the state of the respective qubit.

The system determines parameters for populating respective portions of the QUBO Hamiltonian function represented by the matrix Q (step 404). The parameters include a parameter C that is dependent on the maximum value of a respective variable $x_i$. In some implementations this maximum value can be the same as a target total quantity of BOM components, e.g., A in Equation (1). The parameter C is equal to a difference between the maximum value of the respective variable $x_i$ and the powers of 2 in the sum of the weighted binary-valued variables. For example, the parameter C can take the form $$C_i = \max(x_i) - (2^0 + 2^1 + \ldots + 2^m) \quad (15)$$

As described above, the form of the parameter C as given in Equation (15) reduces the number of qubits required to obtain a solution to the BOM optimization problem.

The determined parameters further include a parameter y that is dependent on the inequality constraint cost threshold B. The parameter y is equal to a difference between the inequality constraint cost threshold B and a linear combination of binary-valued slack variables $d_j$. The number of slack variables included in the linear combination of binary-valued slack variables is less than or equal to the logarithm (to base 2) of: the inequality cost threshold B plus 1, divided by 2. Each slack variable $d_j$ in the linear combination is weighted by a respective power of 2. For example, the parameter y can be given by $$y = B - (2^0 d_0 + 2^1 d_1 + \ldots + 2^q d_q) \quad (16)$$

where $d_j \in \{0,1\}$ and $2^q \leq (B+1)/2$. Each variable $d_j$ corresponds to a respective qubit in the quantum computing resource, and the value taken by each $d_j$ is determined by the state of the respective qubit. The variables $z_i$ in the QUBO formulation given by Equation (3) include the variables $b_j^i$ in Equation (4) and the slack variables $d_j$ in Equation (16).

The determined parameters further include a parameter k that will be used to identify elements of the matrix Q in step 408, as described in more detail below. The parameter k is dependent on the maximum value of a respective variable $x_i$ and is given by $$k = \max(f \text{ for } 2^f < (\max(x_i)+1)/2) + 2. \quad (17)$$

The determined parameters further include a vector r of parameters that includes the parameter C and is given by $$r = (2^0, 2^1, \ldots, 2^m, C). \quad (18)$$

The determined parameters further include a vector s of parameters that includes the parameter y and is given by $$s = (2^0, 2^1, \ldots, 2^q, y). \quad (19)$$

The determined parameters further include a parameter that is dependent on the inequality constraint cost threshold B and is given by $$u = \max(f \text{ for } 2^f < (B+1)/2) + 2. \quad (20)$$

The system populates entries of the matrix Q using the determined parameters (step 406). For example, the system populates diagonal elements of the matrix Q (e.g., adds values to the diagonal entries of the matrix) according to $$Q_{i,i} = s_i \quad (21)$$

for all $i \in Z^+$ that satisfy $i < u$, where $u = \max(f \text{ for } 2^f < (B+1)/2) + 2$ is defined in Equation (20).

The system populates non-diagonal elements of the matrix Q according to $$Q_{j,i} = 2 s_i s_j \quad (22)$$

for all $i, j \in Z^+$ that satisfy $i < u$ and $j < i$, where $u = \max(f \text{ for } 2^f < (B+1)/2) + 2$ is defined in Equation (20) and $s_i$ represents the i-th element of the vector $s = (2^0, 2^1, \ldots, 2^q, y)$ given by Equation (19).

The system populates non-diagonal elements of the matrix Q according to $$Q_{j,i+u} = -2 r_i s_j \quad (23)$$

for all $i, j \in Z^+$ that satisfy $i < k$ and $j < u$, where $u = \max(f \text{ for } 2^f < (B+1)/2) + 2$ is defined in Equation (20), $s_j$ represents the j-th element of the vector $s = (2^0, 2^1, \ldots, 2^q, y)$ defined in Equation (19) and $r_i$ represents the i-th element of the vector $r = (2^0, 2^1, \ldots, 2^m, C)$ defined in Equation (18).

The system populates non-diagonal elements of the matrix Q according to $$Q_{j+u,i+u} = 2 r_i r_j \quad (24)$$

for all $i, j \in Z^+$ that satisfy $i < k$ and $j < i$, where $k = \max(f \text{ for } 2^f < (\max(x_i)+1)/2) + 2$ is defined in Equation (17), $u = \max(f \text{ for } 2^f < (B+1)/2) + 2$ as defined in Equation (20) and $r_i$ represents the i-th element of the vector $r = (2^0, 2^1, \ldots, 2^m, C)$ defined in Equation (18).

The system populates non-diagonal elements of the matrix Q according to $$Q_{i+u,i+u} = r_i^2 \quad (25)$$

for all $i \in Z^+$ that satisfies $i < k$, where $k = \max(f \text{ for } 2^f < (\max(x_i)+1)/2) + 2$ is defined in Equation (17), $u = \max(f \text{ for } 2^f < (B+1)/2) + 2$ is defined in Equation (20) and $r_i$ represents the i-th element of the vector $r = (2^0, 2^1, \ldots, 2^m, C)$ defined in Equation (18).

Returning to FIG. 2, the system provides data representing the QUBO formulation of the request for a BOM recommendation to a quantum computing resource for processing.

The system obtains data representing a solution to the BOM optimization problem from a quantum computing resource (step 206). The data representing the solution to the BOM optimization problem can be data representing a low energy configuration of the states of the qubits associated with components of the BOM recommendation (as described above with reference to Equations 4 and 14. For example, a qubit in the low energy configuration that is in a 1 state can indicate that a respective binary value in a respective binary representation of a respective BOM component corresponding to the qubit is included in the binary representation of the BOM component, therefore the BOM component is included in the BOM recommendation. Qubits that are in a 0 state can represent binary values of binary representations of BOM components that are not included in the binary representations. A binary representation with corresponding qubits that are all in a 0 state indicate that the corresponding BOM component is not included in the final BOM recommendation. Accordingly, the system can extract a BOM recommendation from the data by determining which qubits are in a 1 state and which qubits are in a zero state.

The system initiates an action based on the data representing a solution to the BOM optimization problem (step 208). For example, in some implementations, the obtained data representing the solution to the BOM optimization problem can be presented to a user through a user interface presentation, e.g., a user interface presentation in which the user input data requesting a BOM recommendation at step 202. The user interface presentation can display information about the solution to the BOM optimization problem, including one or more a description of a BOM recommendation corresponding to the solution, a technical drawing of an end product made using the BOM recommendation, and a comparison of costs associated with the solution, e.g., a radar chart with multiple axes representing respective costs. As another example, the system can transmit electronic orders for BOM components included in the BOM recommendation to respective suppliers.

In some implementations the system can store data representing obtained BOM recommendations. For example, the system can store obtained BOM recommendations in a recommendation database. Then, in response to receiving a same data input, the system can retrieve the obtained BOM recommendation from the database.

Because of the computational power provided by the quantum computing device, the runtime of example process 200 can be much faster (compared to classical runtimes). For example, in some cases the runtime can achieve an exponential speed up compared to classical runtimes. Therefore, example process 200 can be repeatedly performed iteratively optimize and refine a product design, e.g., as part of a design for manufacturing process, with improved speed (compared to classical runtimes).

In addition, example process 200 can be used to explore different BOM configurations efficiently. For example, in some implementations the system can receive data representing a BOM optimization problem as described in step 202 and generate a QUBO formulation of the BOM optimization problem as described in step 204. The system can then instruct one or more quantum computing resources to repeatedly process the QUBO formulation to obtain multiple solutions to the BOM optimization problem, where each solution corresponds to a respective computation/run performed by a quantum computing resource. Due to the probabilistic nature of quantum computing, the multiple solutions are likely to differ—the lists of components included in the BOM recommendations are likely to differ and the costs associated with the BOM recommendation can differ (although by construction the costs associated with the BOM recommendation will satisfy the cost thresholds specified by the user at step 202).

The system can then display the multiple solutions in a user interface presentation, e.g., a user interface presentation in which the user input data requesting the BOM recommendation at step 202. The user interface presentation can display information about the multiple solutions, including one or more of a description of each BOM recommendation, technical drawings of end products made using each BOM recommendation, and a comparison of costs associated with the multiple solution, e.g., multiple radar charts with multiple axes representing respective costs. A user can then select a particular BOM recommendation from the multiple solutions based on a user-specific criteria or properties. For example, user can select a BOM recommendation that achieves the highest average quality of BOM components, even if the BOM recommendation/technical drawing of an end product made using the BOM recommendation indicates an aesthetical deviation from an initial design, e.g., the BOM recommendation includes some components of different colours or shapes.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computing device" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

Elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
receiving data representing a bill of materials (BOM) optimization problem, the BOM optimization problem comprising a task of determining a BOM recommendation that satisfies one or more constraints, wherein each constraint comprises one or more constraint variables and a constraint constant;
converting the one or more constraints from a format that is associated with a classical processor into a format that is associated with a quantum computing resource that comprises a plurality of physical qubits, comprising generating, based on the data representing the BOM optimization problem, a quadratic unconstrained binary optimization (QUBO) formulation, wherein the QUBO formulation comprises i) for each constraint variable in the one or more constraints, a binary representation of the constraint variable and ii) a first parameter that depends on a difference between a respective constraint constant and the binary representations of the constraint variables, wherein the first parameter specifies a number of physical qubits required to obtain a solution to the BOM optimization problem;
obtaining data representing a solution to the BOM optimization problem from the quantum computing resource, wherein the data representing a solution to the BOM optimization problem comprises data representing a low-energy configuration of states of the number of physical qubits; and
initiating an action based on the data representing a solution to the BOM optimization problem.

2. The method of claim 1, wherein the one or more constraints comprise equality constraints that penalize candidate BOM recommendations that do not include a target quantity of BOM components, wherein each equality constraint comprises a linear combination of positive integer-valued constraint variables representing respective BOM components, the linear combination equal to a constraint constant representing a respective target quantity of BOM components.

3. The method of claim 2, wherein generating the QUBO formulation comprises, for each equality constraint in the one or more constraints:
determining, for each constraint variable in the equality constraint, a binary representation of the constraint variable, the binary representation comprising a linear combination of one or more binary-valued variables, wherein each binary-valued variable in the linear combination is weighted by a respective power of 2;
determining parameters for populating portions of a matrix representing a QUBO Hamiltonian function, wherein the parameters comprise the first parameter; and
populating entries of the matrix representing the QUBO Hamiltonian function using the determined parameters.

4. The method of claim 3, wherein a number of binary-valued variables included in the linear combination is bounded above by logarithm to base 2 of: the respective target quantity of BOM components plus 1, divided by 2.

5. The method of claim 3, wherein the parameters for populating portions of the matrix representing the QUBO Hamiltonian function further comprise:
a second parameter dependent on a respective target quantity of BOM components A given by $k=\max(f)$ for $2^f < (A+1)/2+2$;
a third parameter given by $l=\max(i)$, where $i$ indexes elements of the QUBO Hamiltonian function; and
a first vector of parameters, wherein the first vector of parameters comprises the first parameter and is given by $r=(2^0, 2^1, \ldots, 2^m, C)$ where $m$ represents a number of binary valued variables in the linear combination and $C$ represents the first parameter.

6. The method of claim 3, further comprising normalizing respective costs associated with each of the constraint variables in the equality constraint using the determined parameters.

7. The method of claim 3, wherein populating entries of the matrix representing the QUBO Hamiltonian function using the determined parameters comprises populating diagonal elements of the matrix representation of the QUBO Hamiltonian function according to $Q_{i,i}=r_f(r_f-2*A+Cost_e)$ for all $e, f \in Z^+$ that satisfy $e<l$, $f<k$, and $l=e*k+f$, where $l=\max(i)$, $k=\max(f)$ for $2^f<(A+1)/2+2$, $r_f$ represents a $f$-th element of vector $r=(2^0, 2^1, \ldots, 2^m, C)$, A represents the respective target quantity of BOM components in the equality constraint, and $Cost_e$ represents a normalized cost of variable $x_e$.

8. The method of claim 3, wherein populating entries of the matrix representing the QUBO Hamiltonian function using the determined parameters comprises populating non-diagonal elements $Q_{i,i}$ of the matrix representation of the QUBO Hamiltonian function according to one or more of
i) $Q_{i,i}=2r_f$ for all $e, f, o \in Z^+$ that satisfy $i=k*o+f$, $j=e*k+f$, $e<l$, $f<k$, $o<e$, where $l=\max(i)$, $k=\max(f)$ to $2^f<(A+1)/2+2$, and $r_f$ represents the $f$-th element of the vector $r=(2^0, 2^1, \ldots, 2^m, C)$,
ii) $Q_{i,i}=(2*r_f*r)_a$ for all $e, f, o, g \in Z^+$ that satisfy, $i=k*o+g$, $j=e*k+f$, $g<f$, $e<l$, $f<k$, $o<e$, where $l=\max(i)$, $k=\max(f)$ for $2^f<(A+1)/2+2$, $r_f$ represents the $f$-th element of the vector $r=(2^0, 2^1, \ldots, 2^m, C)$ and $(2*r_f*r)_g$ represents g-th component of $2*r_f*r$,
iii) $Q_{i,i}=(2*r_f*r)_g$ for all $e, f, o, p \in Z^+$ that satisfy $i=k*o+f$, $j=e*k+p$, $g<f$, $e<l$, $f<k$, $o<e$, where $l=\max(i)$, $k=\max(f)$ for $2^f<(A+1)/2+2$, $r_f$ represents the $f$-th element of the vector $r=(2^0, 2^1, \ldots, 2^m, C)$ and $(2*r_f*r)_g$ represents the g-th component of $2*r_f*r$, and
iv) $Q_{i,i}=(2*r_f*r)_g$ for all $e, f, g \in Z^+$ that satisfy $i=k*e+g$, $j=e*k+f$, $g<f$, $e<l$, $f<k$, where $l=\max(i)$, $k=\max(f)$ for $2^f<(A+1)/2+2$, $r_f$ represents the $f$-th element of the vector $r=(2^0, 2^1, \ldots, 2^m, C)$ and $(2*r_f*r)_g$ represents the g-th component of $2*r_f*r$.

9. The method of claim 1, wherein the one or more constraints comprise inequality constraints that penalize candidate BOM recommendations that exceed respective cost thresholds, wherein each inequality constraint comprises a linear combination of positive integer-valued constraint variables representing respective BOM components, wherein the linear combination is weighted with respective positive integer valued costs and is less than or equal to a constraint constant representing a respective cost threshold.

10. The method of claim 9, wherein the cost thresholds comprise maximum acceptable monetary costs, lead times, weights, volumes or qualities.

11. The method of claim 9, wherein generating the QUBO formulation comprises, for each inequality constraint in the one or more constraints:
   determining, for each constraint variable in the inequality constraint, a binary representation of the constraint variable, the binary representation comprising a linear combination of one or more binary-valued variables, wherein each binary-valued variable in the linear combination is weighted by a respective power of 2;
   determining parameters for populating portions of a matrix representing a QUBO Hamiltonian function, wherein the parameters comprise the first parameter; and
   populating entries of the matrix representing the QUBO Hamiltonian function using the determined parameters.

12. The method of claim 11, wherein the number of binary-valued variables included in the linear combination is bounded above by the logarithm to base 2 of: the respective constraint variable plus 1, divided by 2.

13. The method of claim 11, wherein the parameters for populating portions of the matrix representing the QUBO Hamiltonian function further comprise:
   a fourth parameter dependent on the inequality constraint cost threshold, given by a difference between the inequality constraint cost threshold and a linear combination of binary-valued slack variables, wherein a number of slack variables included in the linear combination of binary-valued slack variables is less than or equal to the logarithm to base 2 of: respective cost threshold B plus 1, divided by 2 and each slack variable in the linear combination is weighted by a respective power of 2;
   a fifth parameter dependent on s maximum value of a respective constraint variable given by $k=\max(f$ for $2^f<\max(x_i)+1)/2)+2$ where $x_i$ represents the respective constraint variable;
   a second vector of parameters, wherein the second vector of parameters comprises the first parameter and is given by $r=(2^0, 2^1, \ldots, 2^m, C)$ where m represents the number of binary valued variables in the linear combination and C represents the first parameter;
   a third vector of parameters, wherein the third vector of parameters comprises the fourth parameter and is given by $s=(2^0, 2^1, \ldots, 2^q, y)$ where q represents the number of slack variables in the linear combination and y represents the fourth parameter; and
   a sixth parameter dependent on the cost threshold and given by $u=\max(f$ for $2^f<(B+1)/2)+2$ where B represents the cost threshold.

14. The method of claim 11, wherein populating entries of the matrix representing the QUBO Hamiltonian function using the determined parameters comprises populating diagonal elements $Q_{i,i}$ of the matrix representation of the QUBO Hamiltonian function according to $Q_{i,i}=s$ for all $i \in Z^+$ that satisfy where $u=\max(f$ for $2^f(B+1)/2)+2$.

15. The method of claim 11, wherein populating entries of the matrix representing the QUBO Hamiltonian function using the determined parameters comprises populating non-diagonal elements of the matrix representation of the QUBO Hamiltonian function according to one or more of
   i) $Q_{i,j}=2s_i s_j$ for all i, $j \in Z^+$ that satisfy i<u and j<i, where $u=\max(f$ for $2^f<(B+1)/2)+2$ and $s_i$ represents i-th element of vector $s=(2^0, 2^1, \ldots, 2^q, y)$,
   ii) $Q_{i,i+u}=-2r_j s_i$ for all i, $j \in Z^+$ that satisfy i=k and j<u, where $u=\max(f$ for $2^f<(B+1)/2)+2$, $s_j$ represents j-th element of the vector $s=(2^0, 2^1, \ldots, 2^q, y)$ and $r_i$ represents the element of the vector $r=(2^0, 2^1, \ldots, 2^m, C)$,
   iii) $Q_{j+u,i+u}=2r_i r_j$ for all i, $j \in Z^+$ that satisfy l<k and j<i, where $k=\max(f$ for $2^f<(\max(x_i)+1)/2)+2$, $u=\max(f$ for $2^f<(B+1)/2)+2$ and $r_i$ represents the i-th element of the vector $r=(2^0, 2^1, \ldots, 2^m, C)$, and
   iv) $Q_{i+u,i+u}=r_i^2$ for all $i \in Z^+$ that satisfies i<k, where $k=\max(f$ for $2^f<(\max(x_i)+1)/2)+2$, $u=\max(f$ for $2^f<(B+1)/2)+2$ and $r_i$ represents the i-th element of the vector $r=(2^0, 2^1, \ldots, 2^m, C)$.

16. The method of claim 1, wherein the data representing the BOM optimisation problem comprises i) a list of components required to manufacture an end product and ii) target properties of a requested BOM.

17. The method of claim 1, wherein the data representing the BOM optimization problem is received as user input through a user interface presentation and wherein initiating an action based on the data representing a solution to the BOM optimization problem comprises:
   displaying, through the user interface presentation, information about the solution to the BOM optimization problem, the information comprising i) a description of a BOM recommendation corresponding to the solution, ii) a technical drawing of an end product made using the BOM recommendation, and iii) a comparison of costs associated with the solution.

18. The method of claim 1, further comprising obtaining data representing multiple solutions to the BOM optimization problem from the quantum computing resource, wherein each solution to the BOM optimization problem corresponds to a respective computation performed by the quantum computing resource.

19. The method of claim 17, wherein the data representing the BOM optimization problem is received as user input through a user interface presentation and wherein initiating an action based on the data representing a solution to the BOM optimization problem comprises:
   displaying, through the user interface presentation, information about multiple solutions to the BOM optimization problem, the information comprising one or more of i) properties of end products corresponding to the multiple solutions to the BOM optimization problem, ii) technical drawings of end products made using the BOM recommendations, and ii) a comparison of costs associated with the multiple solutions.

20. A system comprising:
   a classical processor;
   a quantum computing device in data communication with the classical processor;
   wherein the classical processor and quantum computing device are configured to perform operations comprising:
      receiving data representing a bill of materials (BOM) optimization problem, the BOM optimization problem comprising a task of determining a BOM recommendation that satisfies one or more constraints, wherein each constraint comprises one or more constraint variables and a constraint constant;
      converting the one or more constraints from a format that is associated with a classical processor into a format that is associated with a quantum computing resource that comprises a plurality of physical qubits, comprising generating, based on the data representing the BOM optimization problem, a quadratic unconstrained binary optimization (QUBO) formulation, wherein the QUBO formulation comprises i) for each constraint variable in the one or more constraints, a binary representation of the constraint variable and ii) a first parameter that depends on a difference between a respective constraint constant and the binary representations of the constraint variables, wherein the first parameter specifies a number of physical qubits required to obtain a solution to the BOM optimization problem; and obtaining data representing a solution to the BOM optimization problem from the quantum computing resource, wherein the data representing a solution to the BOM optimization problem comprises data representing a low energy configuration of states of the number of physical qubits.

* * * * *

UNITED STATES PATENT AND TRADEMARK OFFICE
CERTIFICATE OF CORRECTION

PATENT NO. : 11,748,707 B2  
APPLICATION NO. : 17/224625  
DATED : September 5, 2023  
INVENTOR(S) : Rodrigo Morimoto Suguiura and Jair Antunes De Carvalho, Jr.

Page 1 of 1

It is certified that error appears in the above-identified patent and that said Letters Patent is hereby corrected as shown below:

In the Claims

In Claim 7, Column 22, Line 27, after "elements" insert -- Qi,i --.

In Claim 8, Column 22, Line 38, delete "Qi,i" and insert -- Qi,j --.

In Claim 8, Column 22, Line 40, delete "Qi,i" and insert -- Qi,j --.

In Claim 8, Column 22, Line 41, delete "to" and insert -- for --.

In Claim 8, Column 22, Line 44, delete "Qi,i=(2*rf*r)a" and insert -- Qi,j=(2*rf*r)g --.

In Claim 8, Column 22, Line 49, delete "Qi,i" and insert -- Qi,j --.

In Claim 8, Column 23, Line 54, delete "Qi,i" and insert -- Qi,j --.

In Claim 14, Column 23, Line 59, delete "2f(B+1)/2)+2." and insert -- 2f<(B+1)/2)+2. --.

In Claim 15, Column 23, Line 54, after "elements" insert -- Qi,j --.

In Claim 15, Column 23, Line 65, delete "Qi,i=2sisi" and insert -- Qi,j=2sisj --.

In Claim 15, Column 24, Line 1, delete "Qi,i+u=-2risi" and insert -- Q(j,i+u) = -2ri sj --.

In Claim 15, Column 24, Line 1, delete "i=k" and insert -- i<k --.

In Claim 15, Column 24, Line 4, before "element" insert -- i-th --.

In Claim 19, Column 24, Line 47, delete "ii)" and insert -- (iii) --.

Signed and Sealed this  
Second Day of January, 2024

Katherine Kelly Vidal  
*Director of the United States Patent and Trademark Office*